Patented July 2, 1935

2,007,144

UNITED STATES PATENT OFFICE 2,007,144

METHOD OF MAKING ETHYLIDENE CHLORIDE

Howard S. Nutting, Peter S. Petrie, and Myron E. Huscher, Midland, Mich., assignors to The Dow Chemical Company, Midland, Mich., a corporation of Michigan No Drawing. Application March 8, 1934, Serial No. 714,656

9 Claims. (Cl. 260—162)

This invention concerns an improved method of making ethylidene chloride by reacting hydrogen chloride with vinyl chloride in the presence of a catalyst.

It is known that hydrogen chloride and vinyl chloride can be reacted in vapor phase in the presence of solid aluminum chloride as catalyst to form ethylidene chloride, as disclosed in United States Patent No. 1,900,276, in which an approximately equimolecular gaseous mixture of said reactants is passed through an anhydrous body of aluminum chloride at between 25° and 150° C., whereby from 20 to 40 per cent of the vinyl chloride employed can be converted to ethylidene chloride in a single pass.

We have tested said method and have found that, although ethylidene chloride can be produced in the yield stated in the patent, a considerable proportion, e. g. from about 40–75 per cent, of the vinyl chloride employed is retained in the aluminum chloride and forms therewith a syrupy mass from which little if any unreacted vinyl chloride can be recovered. Furthermore, the syrupy mass which is formed frequently interferes with or stops the gas flow, thereby preventing smooth reaction. Accordingly, the method disclosed in the above patent is not well adapted to commercial practice.

We have now found that by carrying the reaction out in a non-aqueous liquid medium, rather than in vapor phase, the yield of ethylidene chloride is increased considerably, by-product formation is reduced, and the attendant operating difficulty mentioned above is avoided. We have also found that, when the reaction is carried out in liquid phase according to our method, either aluminum chloride or ferric chloride may successfully be employed as the reaction catalyst. The invention, accordingly, consists in the method of making ethylidene chloride hereinafter fully described and particularly pointed out in the claims.

Broadly, our method consists in dissolving or suspending the catalyst, aluminum or ferric chloride, in a non-aqueous liquid medium and thereafter reacting the hydrogen chloride and vinyl chloride in the resultant mixture at between about 10° and 135° C., preferably between 15° and 60° C. The liquefied reactant, vinyl chloride, or the product, ethylidene chloride, is preferably employed as the reaction medium, since the reaction occurs smoothly and rapidly in the presence of either of said compounds and their use simplifies the step of purifying the product. However, other non-reactive solvents, e. g. trichloroethane, acetylene tetrachloride, etc., may be employed, if desired.

The hydrogen chloride and vinyl chloride reactants may be employed in any desired proportions, but we prefer to employ an excess of hydrogen chloride, since it is the least expensive of said reactants. The catalyst may also be employed in any desired proportion, but the reaction occurs most rapidly when at least 1 gram of catalyst is used per 100 grams of vinyl chloride. We prefer to avoid the use of more than 6 grams of aluminum chloride per 100 grams of vinyl chloride, since when larger proportions are used, high boiling by-products are sometimes formed to an objectionable extent. Considerably larger proportions of ferric chloride than the above, however, may be employed without excessive by-product formation occurring.

The reaction may be carried out at atmospheric pressure, but is more rapid and complete at higher pressures. In practice, we prefer to charge an autoclave with the desired quantities of liquefied vinyl chloride and aluminum or ferric chloride catalyst. The vinyl chloride must, of course, be introduced into the autoclave either under pressure or below its atmospheric boiling point, i. e. −18° C. Thereafter, hydrogen chloride is charged into the autoclave under pressure, preferably at the rate required to maintain the desired reaction temperature. As alternative procedure, the autoclave may initially be cooled to below about −18° C., charged with liquid vinyl chloride, hydrogen chloride, and the catalyst, and then warmed to a reaction temperature, but when such procedure is followed a violent reaction sometimes occurs with excessive rise in temperature and pressure. During the reaction, the liquid vinyl chloride, which is employed both as a reactant and as the reaction medium, is converted to ethylidene chloride, which in turn serves as the liquid reaction medium.

After all of the reactants have been charged into the autoclave, the mixture is allowed to stand, preferably with agitation, for about 1 hour in order to assure substantially complete reaction. Any vapors present are then released from the autoclave and collected, after which the reaction mixture is removed and treated with water to render the catalyst inactive. The ethylidene chloride product is separated by distillation, preferably with steam.

Instead of using the liquefied reactant, vinyl chloride, as the reaction medium, other non-aqueous solvents which boil at above room temperature, e. g. naphtha, trichloro-ethane, acetylene tetrachloride, ethylidene choride, etc., may be empoyed, in which case the reaction may be carried out either at atmospheric or at an elevated pressure. A convenient mode of operation is to mix the aluminum or ferric chloride catalyst with ethylidene chloride, pass hydrogen chloride and vinyl chloride simultaneously into the mixture, and distill the ethylidene chloride product directly from the reaction mixture either periodically or as it is formed. Any hydrogen chloride and vinyl chloride which pass through the mixture without reacting may readily be separated from the product and recycled in the process. By operating in such manner, the process is made continuous and the quantity of catalyst required to produce a given quantity of ethylidene chloride is reduced materially.

The following examples illustrate several ways in which the principle of our invention has been applied, but are not to be construed as limiting the invention.

*Example 1*

4 grams of aluminum chloride was added to 231 grams of ethylidene chloride and gaseous hydrogen chloride and vinyl chloride were simultaneously passed into the mixture, each at a rate of 300 cubic centimeters per minute, for a period of 2 hours, the mixture being maintained at approximately 25° C. during the operation. After the reaction was completed, the reacted mixture was steam distilled to separate the ethylidene chloride product. Approximately 8 per cent of the vinyl chloride employed was recovered during said distillation. The yield of ethylidene chloride was approximately 85 per cent of theoretical, based on the quantity of vinyl chloride consumed in the reaction.

*Example 2*

An iron bomb was cooled to −80° C., charged with 2 grams of anhydrous aluminum chloride, 134 grams (2.14 moles) of liquid vinyl chloride, and 50 grams (1.37 moles) of anhydrous hydrogen chloride, and was then closed. The bomb was agitated continuously and permitted to warm slowly to about 11° C., when a violent reaction occurred accompanied by a sudden rise in temperature and pressure. The reaction was substantially complete within a few moments, as indicated by a sharp pressure drop, but in order to assure complete reaction the mixture was permitted to remain in the bomb for about 1 hour. The charge was then removed and steam distilled whereby 134 grams (1.36 moles) of substantially pure ethylidene chloride was obtained. The yield of ethylidene chloride was 99 per cent of theoretical, based on the quantity of hydrogen chloride used.

*Example 3*

An autoclave provided with an inlet for hydrogen chloride was cooled to approximately −80° C. and charged with 1.5 grams of aluminum chloride and 147.5 grams (2.36 moles) of liquid vinyl chloride. The autoclave was then sealed, warmed to room temperature, and 77 grams (2.11 moles) of anhydrous hydrogen chloride was gradually charged therein under pressure at such rate as to maintain the mixture at a temperature between 34° and 44° C. After the reaction was complete the pressure on the bomb was released and the gaseous unreacted hydrogen chloride and vinyl chloride evolved was collected. The liquid reaction mixture was steam distilled to separate the ethylidene chloride product and a small additional quantity of unreacted vinyl chloride. The aqueous layer of the distillate and the liquor remaining in the still were each analyzed to determine the hydrogen chloride contained therein. There was obtained from the reacted mixture 177 grams (1.79 moles) of ethylidene chloride, 20.2 grams (0.32 mole) of unreacted vinyl chloride, and 7.7 grams (0.21 mole) of unreacted hydrogen chloride. The yield of ethylidene chloride was 94 per cent of theoretical, based on the quantity of hydrogen chloride consumed in the reaction.

*Example 4*

An autoclave provided with an inlet for hydrogen chloride was cooled to about −80° C., charged with 9 grams of ferric chloride and 151.5 grams (2.44 moles) of vinyl chloride, and closed. The autoclave was then warmed to room temperature and 108 grams (2.96 moles) of gaseous hydrogen chloride was passed slowly thereinto under pressure at such rate as to maintain the mixture at a temperature between 30° and 41° C. The reacted mixture was then removed from the autoclave and steam distilled, whereby 226 grams (2.28 moles) of ethylidene chloride was separated. The yield of ethylidene chloride was 94 per cent of theoretical, based on the quantity of vinyl chloride employed.

Example 1 above illustrates the preparation of ethylidene chloride at atmospheric pressure by passing gaseous hydrogen chloride and vinyl chloride into a mixture of aluminum chloride and a non-aqueous liquid medium.

Example 2 shows that by carrying the reaction out under pressure, ethylidene chloride can be produced in practically quantitative yield. However, the same example shows that when the entire reaction mixture is initially charged into a reactor, the reaction which occurs is liable to be violent.

Example 3 illustrates control of the reaction by initially charging an autoclave with liquefied vinyl chloride and aluminum chloride and thereafter introducing the hydrogen chloride reactant under pressure at the rate necessary to maintain the desired reaction temperature.

Example 4 illustrates the use of ferric chloride to catalyze the formation of ethylidene chloride by our method.

Although the reaction is preferably carried out at a temperature below 60° C., since ethylidene chloride is produced in maximum yield with minimum by-product formation at the lower reaction temperatures, the reaction may be carried out at temperatures as high at 135° C. Due to by-product formation, commercial operation at above 135° C. is impracticable.

The hydrogen chloride and vinyl chloride reactants employed in our process may conveniently be produced by cracking ethylene chloride, e. g. by passing ethylene chloride vapors through an iron tube heated to between 400° and 500° C. The resultant hydrogen chloride and vinyl chloride mixture may then be reacted to produce ethylidene chloride by the procedure hereinbefore described. By operating in such manner, ethylidene chloride may be produced in good yield and at low cost from its isomer, ethylene chloride.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making ethylidene chloride wherein hydrogen chloride is reacted with vinyl chloride in the presence of a catalyst selected from the class consisting of aluminum chloride and ferric chloride, the improvement which consists in carrying the reaction out in non-aqueous liquid phase.

2. In a method of making ethylidene chloride, the step which consists in reacting hydrogen chloride with vinyl chloride in non-aqueous liquid phase and in the presence of a catalyst selected from the class consisting of aluminum chloride and ferric chloride at a temperature between about 10° and about 135° C.

3. In a method of making ethylidene chloride, the step which consists in reacting hydrogen chloride with vinyl chloride in non-aqueous liquid phase and in the presence of a catalyst selected from the class consisting of aluminum chloride and ferric chloride at a temperature between about 15° and about 60° C.

4. In a method of making ethylidene chloride, the steps which consist in mixing a catalyst selected from the class consisting of aluminum chloride and ferric chloride with ethylidene chloride, adding hydrogen chloride and vinyl chloride, and maintaining the resultant mixture at a temperature between about 15° and about 60° C.

5. In a method of making ethylidene chloride, the steps which consist in adding a catalyst selected from the class consisting of aluminum chloride and ferric chloride to sufficient ethylidene chloride to form a thin mixture and passing hydrogen chloride and vinyl chloride simultaneously into the mixture at approximately atmospheric pressure while maintaining said mixture at a temperature between about 15° and about 60° C.

6. In a method of making ethylidene chloride, the steps which consist in passing hydrogen chloride and vinyl chloride, simultaneously and at approximately atmospheric pressure, into a heated mixture of ethylidene chloride and a catalyst selected from the class consisting of aluminum chloride and ferric chloride, distilling ethylidene chloride from the mixture as it is formed, condensing ethylidene chloride from the distilled vapors, and returning any uncondensed vapors to the reaction.

7. In a method of making ethylidene chloride, the steps which consist in charging a reactor with liquefied vinyl chloride, hydrogen chloride, and a catalyst selected from the class consisting of aluminum chloride and ferric chloride, closing the reactor and maintaining the mixture within the closed reactor at a temperature between about 15° and about 60° C.

8. In a method of making ethylidene chloride, the steps which consist in charging a reactor with liquefied vinyl chloride and a catalyst selected from the class consisting of aluminum chloride and ferric chloride, closing the reactor and thereafter charging hydrogen chloride into the reactor under pressure at such rate as to maintain the reaction mixture at a temperature between about 15° and about 60° C.

9. In a method of making ethylidene chloride, the steps which consist in charging a reactor with liquefied vinyl chloride and a catalyst selected from the class consisting of aluminum chloride and ferric chloride, closing the reactor, charging hydrogen chloride into the reactor under pressure at such rate as to maintain the reaction mixture at a temperature between about 15° and about 60° C., and thereafter steam distilling ethylidene chloride from the reacted mixture.

HOWARD S. NUTTING.
PETER S. PETRIE.
MYRON E. HUSCHER.

DISCLAIMER 2,007,144.—*Howard S. Nutting, Peter S. Petrie*, and *Myron E. Huscher*, Midland, Mich. METHOD OF MAKING ETHYLIDENE CHLORIDE. Patent dated July 2, 1935. Disclaimer filed May 22, 1940, by the assignee, *The Dow Chemical Company*.

Hereby enters this disclaimer to the claims in said specification and to that portion of the descriptive matter in said specification to wit:

Claim 6 in its entirety;

From the scope of claims 1, 2, 3, 4, and 5, the use of the method therein claimed in a continuous process wherein ethylidene chloride is distilled from the reaction mixture as it is formed.

From the descriptive portion of the specification, page 2, first column, beginning in line 4—

"A convenient mode of operation is to mix the aluminum or ferric chloride catalyst with ethylidene chloride, pass hydrogen chloride and vinyl chloride simultaneously into the mixture, and distill the ethylidene chloride product directly from the reaction mixture either periodically or as it is formed. Any hydrogen chloride and vinyl chloride which pass through the mixture without reacting may readily be separated from the product and recycled in the process. By operating in such manner, the process is made continuous and the quantity of catalyst required to produce a given quantity of ethylidene chloride is reduced materially."

[*Official Gazette June 18, 1940.*]